(12) United States Patent
Jo et al.

(10) Patent No.: US 11,505,004 B2
(45) Date of Patent: Nov. 22, 2022

(54) FLEXIBLE WHEEL

(71) Applicants: Hyundai Motor Company, Seoul (KR); KIA Motors Corporation, Seoul (KR)

(72) Inventors: Sun-Myoung Jo, Yeoju-si (KR); Jung-Woo Lee, Seoul (KR); Hoon Chung, Busan (KR); Jin Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 490 days.

(21) Appl. No.: 16/685,395

(22) Filed: Nov. 15, 2019

(65) Prior Publication Data

US 2020/0276865 A1 Sep. 3, 2020

(30) Foreign Application Priority Data

Feb. 28, 2019 (KR) .................. 10-2019-0023846

(51) Int. Cl.
 *B60C 7/24* (2006.01)
 *B60C 7/14* (2006.01)
 *B60C 7/10* (2006.01)
 *B60B 9/26* (2006.01)

(52) U.S. Cl.
 CPC ............. *B60C 7/24* (2013.01); *B60C 7/143* (2013.01); *B60C 7/146* (2021.08); *B60B 9/26* (2013.01); *B60C 7/10* (2013.01); *B60C 7/107* (2021.08)

(58) Field of Classification Search
 CPC B60C 7/10; B60C 7/107; B60C 7/143; B60C 7/146; B60C 7/18; B60C 7/24; B60C 7/26; A61G 5/061
 See application file for complete search history.

(56) References Cited

U.S. PATENT DOCUMENTS

| | | | |
|---|---|---|---|
| 6,170,544 B1 | 1/2001 | Hottebart | |
| 6,286,572 B1 * | 9/2001 | Chen | B60D 1/52 152/84 |
| 9,445,960 B2 | 9/2016 | Abughaida | |
| 10,023,004 B2 | 7/2018 | Lin | |
| 2006/0174989 A1 | 8/2006 | Jones | |
| 2012/0038207 A1 * | 2/2012 | Williams | B60C 7/18 301/37.23 |

FOREIGN PATENT DOCUMENTS

| | | | | |
|---|---|---|---|---|
| CN | 107757259 A | * | 3/2018 | ............... B60C 7/24 |
| JP | H04-059491 A | | 2/1992 | |
| JP | 2007-045387 A | | 2/2007 | |
| JP | 2015080965 A | * | 4/2015 | ............... B60B 9/04 |
| KR | 10-2014-0129656 A | | 11/2014 | |
| WO | WO-2018112650 A1 | * | 6/2018 | ............... B60B 9/26 |

* cited by examiner

*Primary Examiner* — Kip T Kotter
(74) *Attorney, Agent, or Firm* — Lempia Summerfield Katz LLC (57) ABSTRACT

A flexible wheel may include a flexible tire section which is deformable in a radial direction from a circumference thereof, and an anti-bending guide section coupled with the flexible tire section. The anti-bending guide section is connected to a driving shaft, and the flexible tire section and the anti-bending guide section are concentric. The flexible tire section includes a ring-shaped outer layer, one or more inner layers, and a plurality of spokes. In addition, the anti-bending guide section includes a plurality of plates, a hub, and a plurality of guides.

11 Claims, 6 Drawing Sheets

FLEXIBLE WHEEL

CROSS-REFERENCE TO RELATED APPLICATIONS

This application claims priority to and the benefit of Korean Patent Application No. 10-2019-0023846, filed on Feb. 28, 2019, which is incorporated herein by reference in its entirety.

FIELD

The present disclosure relates to a flexible wheel, and more particularly, to a flexible wheel which can be used in a means of transportation.

BACKGROUND

The statements in this section merely provide background information related to the present disclosure and may not constitute prior art.

A means of transportation configured to transport people and an article is equipped with a wheel which is rotated through friction generated between the wheel and the ground. The wheel includes a rigid rim which is made from steel and maintains a shape of the wheel, and a tire which is made from rubber and substantially rubs against the ground. The tire has elasticity, but is fully filled with air to support a weight of the means of transportation, and thus a deformation of the tire shape is extremely restricted.

Since the deformation of the tire shape is restricted, we have discovered that when there is a continuous obstacle, such as stairs, a rotational center of the wheel is changed over time depending on a surface shape of the obstacle. As the rotational center of the wheel is changed, a person riding or an article loaded on the means of transportation is vertically shaken. We have further discovered that in the event of extreme shaking, there is a high possibility that the means of transportation is overturned, and a person and/or article may also be damaged.

Therefore, when a continuous obstacle appears while the means of transportation is being driven, a user must manipulate the means of transportation to bypass the obstacle or stop driving thereof.

The above information disclosed in this Background section is only for enhancement of understanding of the background of the present disclosure, and therefore it may contain information that does not form the prior art that is already know to a person of ordinary skill in the art.

SUMMARY

The present disclosure provides a flexible wheel which keeps a rotational center, e.g. as a straight line or along the line of travel, to inhibit an occurrence of a vertical shaking even when driven on a top surface of a continuous obstacle such as stairs.

According to a form of the present disclosure, a flexible wheel for connecting to a driving shaft on which a fixing nut is mounted includes a flexible tire section which is deformable in a radial direction from a circumference thereof, an anti-bending guide section coupled with the flexible tire section, wherein the anti-bending guide section is connected to the driving shaft, and the flexible tire section and the anti-bending guide section are concentric.

According to a further aspect of the present disclosure, the flexible tire section may include a ring-shaped outer layer, one or more inner layers having an inner diameter smaller than an inner diameter of the outer layer and being concentric with the outer layer, and a plurality of spokes formed to extend from an inner circumferential surface of the outer layer to an outer circumferential surface of a first inner layer or formed to extend from an inner circumferential surface of the first inner layer to the outer circumferential surface of a second inner layer.

According to a further aspect of the present disclosure, the plurality of spokes may be rounded or curved in a rotational direction of the flexible tire section to have a streamline shape.

According to a further aspect of the present disclosure, the spokes may generate a supporting force and a climbing force when the flexible wheel goes up stairs.

According to a further aspect of the present disclosure, each of the plurality of spokes may extend from the second inner layer having the smallest inner diameter among the one or more inner layers and pass through the first inner layer towards the outer layer while having a variable curvature.

According to a further aspect of the present disclosure, the anti-bending guide section may include a plurality of plates formed integrally with one or more inner layers of the flexible tire section, a hub provided with a plurality of through hinges passing through the plate and the one or more inner layers, and a plurality of guides, each of which being formed in a form of bar having a width, being hingedly fixed to the outer layer of the flexible tire section through one end thereof and having a slit formed therein. Each of the through hinge is moved in the slit in a longitudinal direction of the respective guides.

According to a further aspect of the present disclosure, the hub may include a hub body to which the plurality of through hinges are perpendicularly fixed.

According to a further aspect of the present disclosure, a fastening hole through which the driving shaft passes may be formed at a center of the hub body in a state where the driving shaft passes through the fastening hole, so that the flexible tire section and the anti-bending guide section are subordinated to the driving shaft.

According to a further aspect of the present disclosure, the plurality of plates may include a first plate that is in contact with the one or more inner layers, and a second plate overlapping the first plate to cover first guides arranged on one surface of the first plate.

According to a further aspect of the present disclosure, second guides may be arranged on one surface of the second plate, the plates may further include a third plate overlapping the second plate to cover the second guides arranged on one surface of the second plate, and the first guides which are in contact with the first plate and the second guides which are in contact with the third plate may form a predetermined angle so as not to overlap each other.

According to a further aspect of the present disclosure, the anti-bending guide section may further include a fixing plate which is symmetrical with the first plate with respect to the flexible tire section, and fixing members may be mounted on the plurality of through hinges passing through the fixing plate to allow the flexible tire section and the anti-bending guide section to be assembled integrally with each other.

According to one form of the present disclosure, the flexible wheel may be mounted onto an equipment which is capable of being moved without any restriction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As illustrated in FIGS. 1 to 5, a flexible wheel 10 according to one form of the present disclosure includes a flexible tire section 100 which is deformable in a radial direction from a circumference thereof according to a type of an obstacle on which the flexible vehicle is being driven, and an anti-bending guide section 200 coupled with the flexible tire section 100. The anti-bending guide section 200 is connected to a driving shaft (not shown). The flexible tire section 100 and the anti-bending guide section 200 are concentric.

Figure 1:
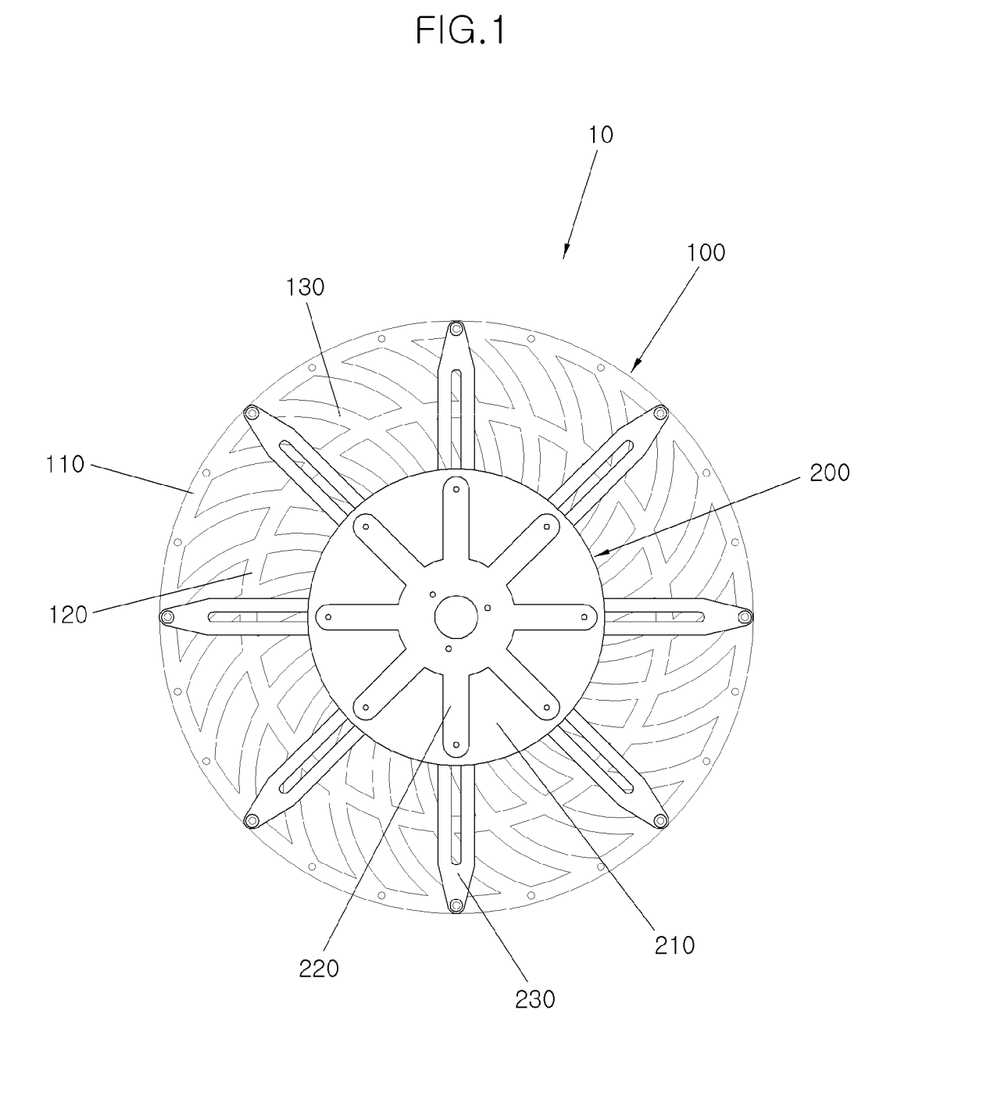
FIG. 1 is front view of a flexible wheel in accordance with one form of the present disclosure.
Figure 2:
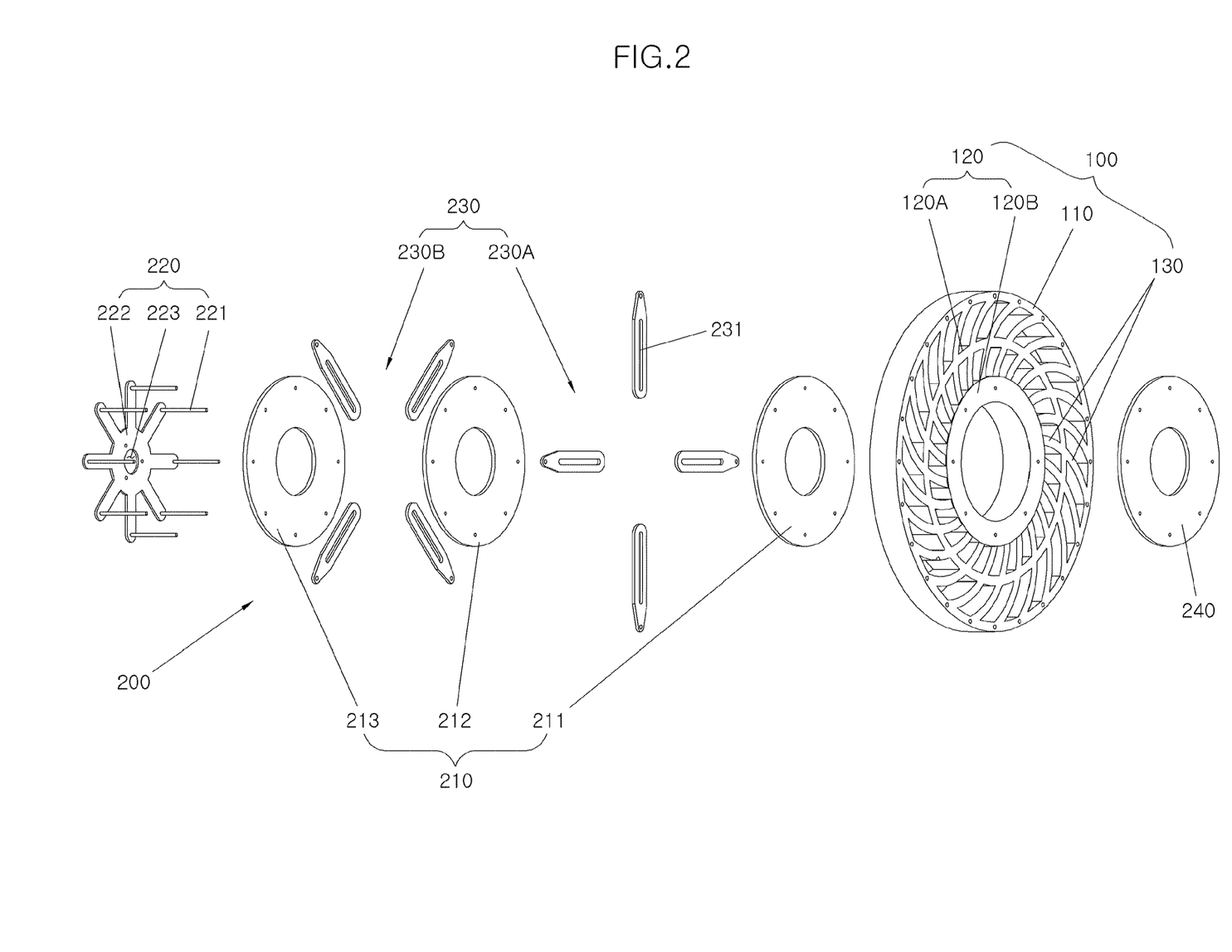
FIG. 2 is an exploded perspective view of the flexible wheel illustrated in FIG. 1.

The flexible tire section 100 includes a ring-shaped outer layer 110 configured to be in contact with a driving surface that is a surface of obstacle, one or more inner layers 120 having an inner diameter smaller than that of the outer layer 110 and being concentric with the outer layer 110, and a plurality of spokes 130 formed to extend from an inner circumferential surface of the outer layer 110 to an outer circumferential surface of the inner layer 120 or formed to extend from an inner circumferential surface of the inner layer 120 to the outer circumferential surface of another inner layer 120.

The plurality of spokes 130 are rounded (or curved) in a rotational direction of the flexible tire section 100 to have a streamline shape. As the spokes 130 are formed to have the streamline shape, when the wheel is driven on a top surface of obstacle such as a stair, the flexible tire section 100 is deformed in shape, and an end portion of the spoke 130 is positioned on a top surface of another stair which is positioned above the stair on which the flexible tire section is placed. As the flexible tire section 100 and the anti-bending guide section 200 are rotated, a moment is generated with respect to the end portion of the spoke 130 positioned on the stair which is positioned above the stair on which the flexible tire section is placed. The generated moment acts as a supporting force allowing the flexible tire section to be maintained on a top surface of the stair and a climbing force allowing another spoke 130 to be moved onto the adjacent stair which is positioned above the stair on which the flexible tire section is positioned.

Figure 6:
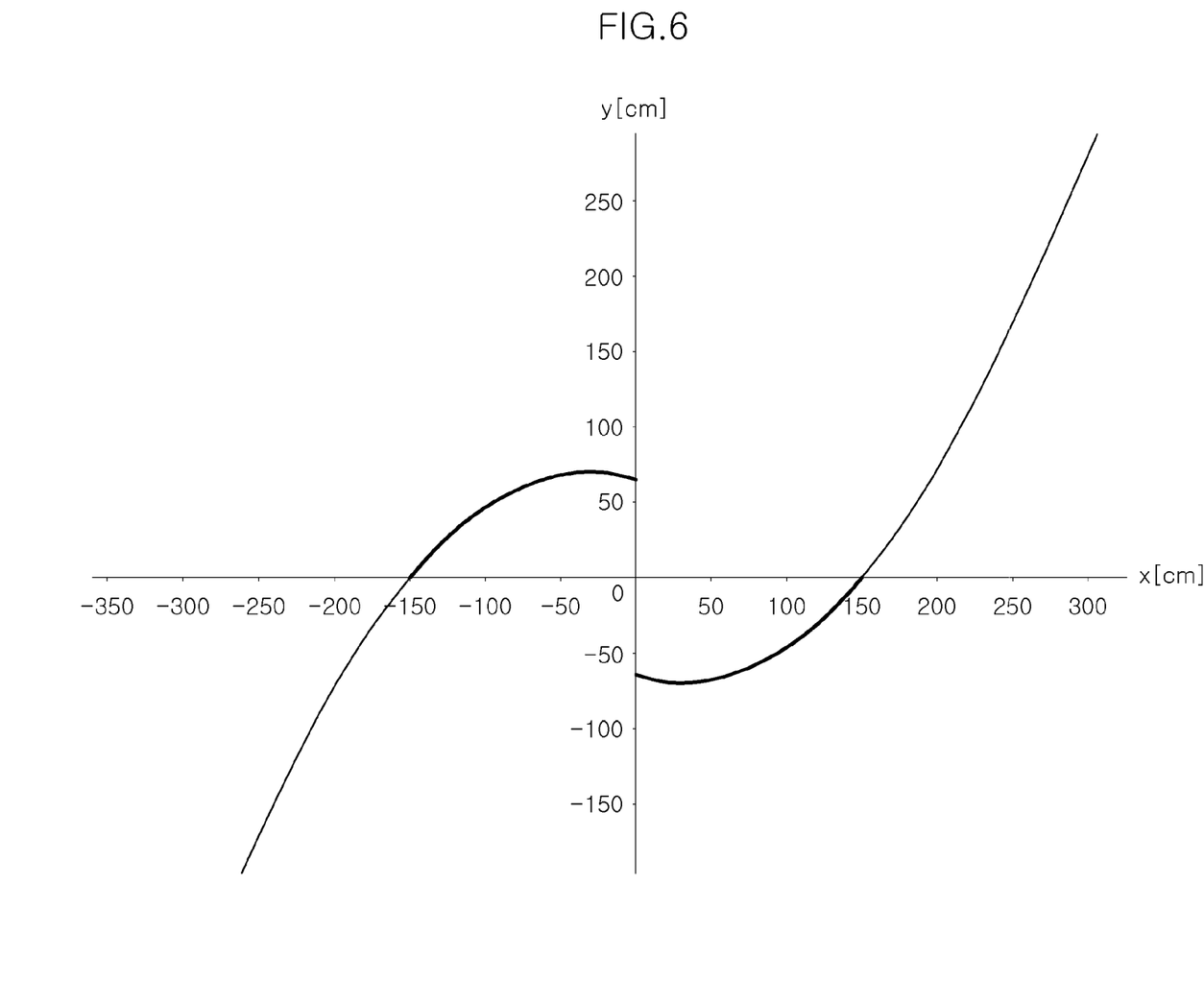
FIG. 6 is a variable curvature graph.

According to one example, each of the plurality of spokes 130 has a variable curvature and extends from the inner layer having the smallest inner diameter among the one or more inner layers 120 and passes through another inner layer towards the outer layer 110. The variable curvature is calculated from the following Equation 1:

$$x^2 + y^2 = \left( \frac{a}{1 - \tan(\alpha) \cdot \tan^{-1}\left(\frac{y}{x}\right)} \right)^2, \qquad \langle \text{Equation 1} \rangle$$

where "a" is a radius of the flexible tire section 100, and "α" is an angle formed by a top surface of the stair and a trajectory along which a rotational center of the flexible tire section 100 is moved. FIG. 6 shows a graph of the variable curvature of the deformation Equation 1. "a" is supposed 150 Cm. "α" is supposed a gradient of stairs (0.7 rad).

Inner diameters of the plurality of inner layers 120 are selected as desired. The inner diameter of the inner layer 120 having the smallest inner diameter among the plurality of inner layers 120 is greater than an outer diameter of the driving shaft. As illustrated in FIG. 2, for example, the two inner layers 120 are formed inside the outer layer 110. A thickness of the first inner layer 120A close to the outer layer 110 is the same as a thickness of the outer layer 110. The thickness of the second inner layer 1206 which is far away from the outer layer 110 is greater than thickness of each of the outer layer 110 and the first inner layer 120A.

As shown in FIG. 2, the anti-bending guide section 200 includes a plurality of plates 210 formed integrally with the inner layers 120 of the flexible tire section 100, a hub 220 provided with a plurality of through hinges 221 passing through the plates 210 and one of the inner layers 120, and a plurality of guides 230, each of which being formed in the form of bar having a width, being hingedly fixed to the outer layer 110 of the flexible tire section 100 through one end thereof and having a slit 231 formed therein. Here, the through hinge 221 is moved in the slit 231 of the guides 230 in a longitudinal direction of the guides 230.

The plurality of guides 230 are arranged to form a specific angle between two adjacent guides with respect to a center of the flexible tire section 100. The hub 220 includes a hub body 222 to which the plurality of through hinges 221 are perpendicularly fixed. A fastening hole 223 through which the driving shaft passes is formed at a center of the hub body 222. A fixing nut (not shown) is mounted on the driving shaft in a state where the driving shaft passes through the fastening hole 223, so that the flexible tire section 100 and the anti-bending guide section 200 are subordinated to the driving shaft (not shown).

As shown in FIG. 2, for example, the plates 210 includes a first plate 211 that is in contact with the second inner layer 120B, a second plate 212 overlapping the first plate 211 to cover one or more guides 230A as the first guides arranged on one surface of the first plate 211 facing to the second plate 212, and a third plate 213 overlapping the second plate 212 to cover one or more guides 230B as the second guides arranged on one surface of the second plate 212 facing to the third plate 213. The first guides 230A which are in contact with the first plate 211 and the second guides 230B which are in contact with the third plate 213 form a predetermined angle so as not to overlap each other as shown in FIG. 2.

When the flexible tire section 100 is deformed in shape, the guides 230 are moved towards a center of the plates 210. By arranging the first guides 230A which are in contact with the first plate 211 and the second guides 230B which are in contact with the third plate 213 so as not to overlap each other, the guides 230 are inhibited from rubbing against each other when moved toward the center of the plates 210.

Figure 3:
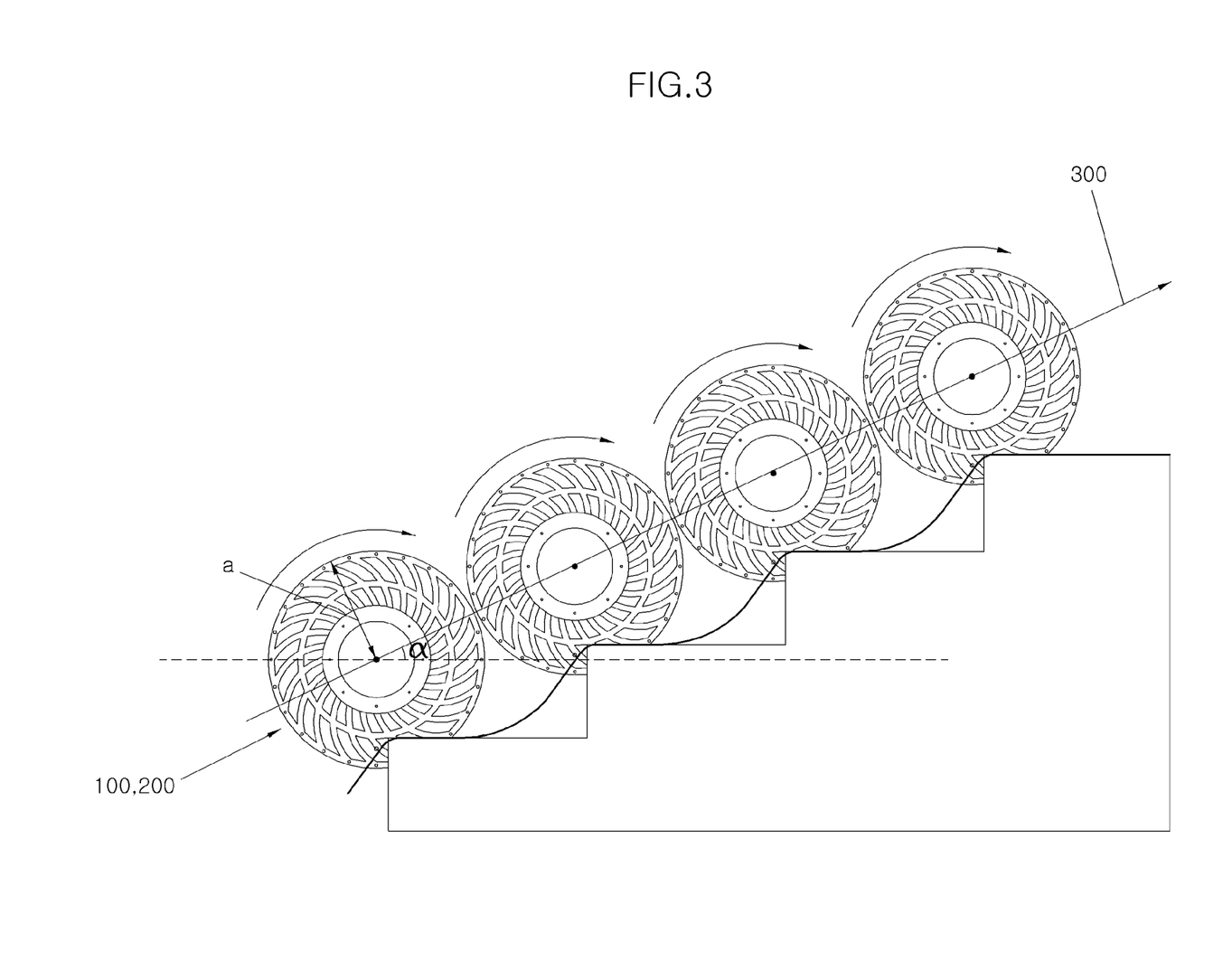
FIG. 3 is a view showing a rotational center of the flexible wheel shown in FIG. 1 when being driven on a top surface of each stair.

The anti-bending guide section 200 further includes a fixing plate 240 which is symmetrical with the first plate 211 with respect to the flexible tire section 100. Fixing members are mounted on the plurality of through hinges 221 passing through the fixing plate 240 to allow the flexible tire section 100 and the anti-bending guide section to be assembled integrally with each other. According to one form of the present disclosure, even if the flexible wheel 10 is driven on a top surface of a continuous obstacle like stairs, the flexible tire section 100 is deformed in shape in the radial direction from the circumference of the flexible wheel 10 according to the shape of the top surface of the obstacle, whereas a deformation of the flexible tire section 100 in a circumferential direction is inhibited by the anti-bending guide section 200. Therefore, the rotational center of the flexible tire section is maintained as a straight line 300 as shown in FIG. 3 and the occurrence of vertical shaking of the flexible tire section 100 is inhibited.

Figure 4:
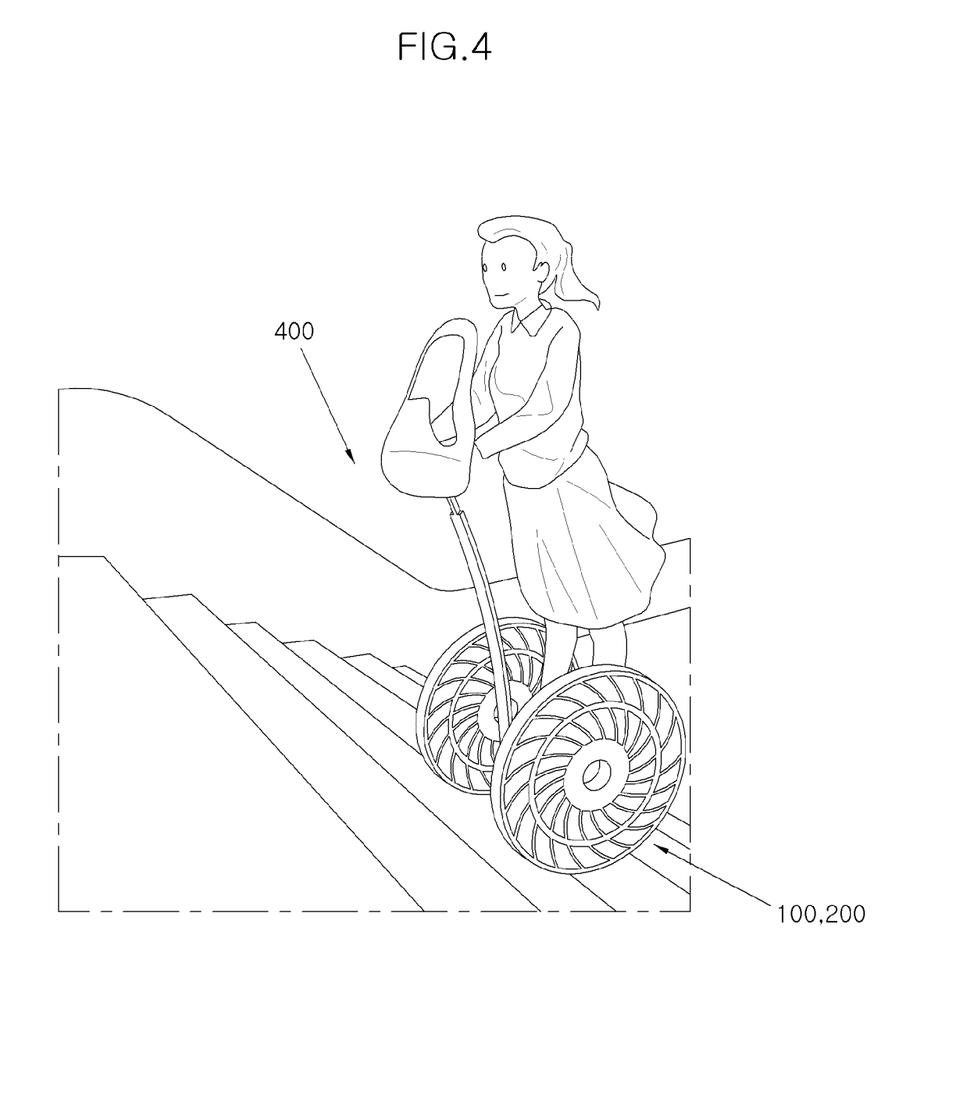
FIGS. 4 and 5 are exemplary views of an equipment or a wheelchair on which the flexible wheel shown in FIG. 1 is mounted.
Figure 5:
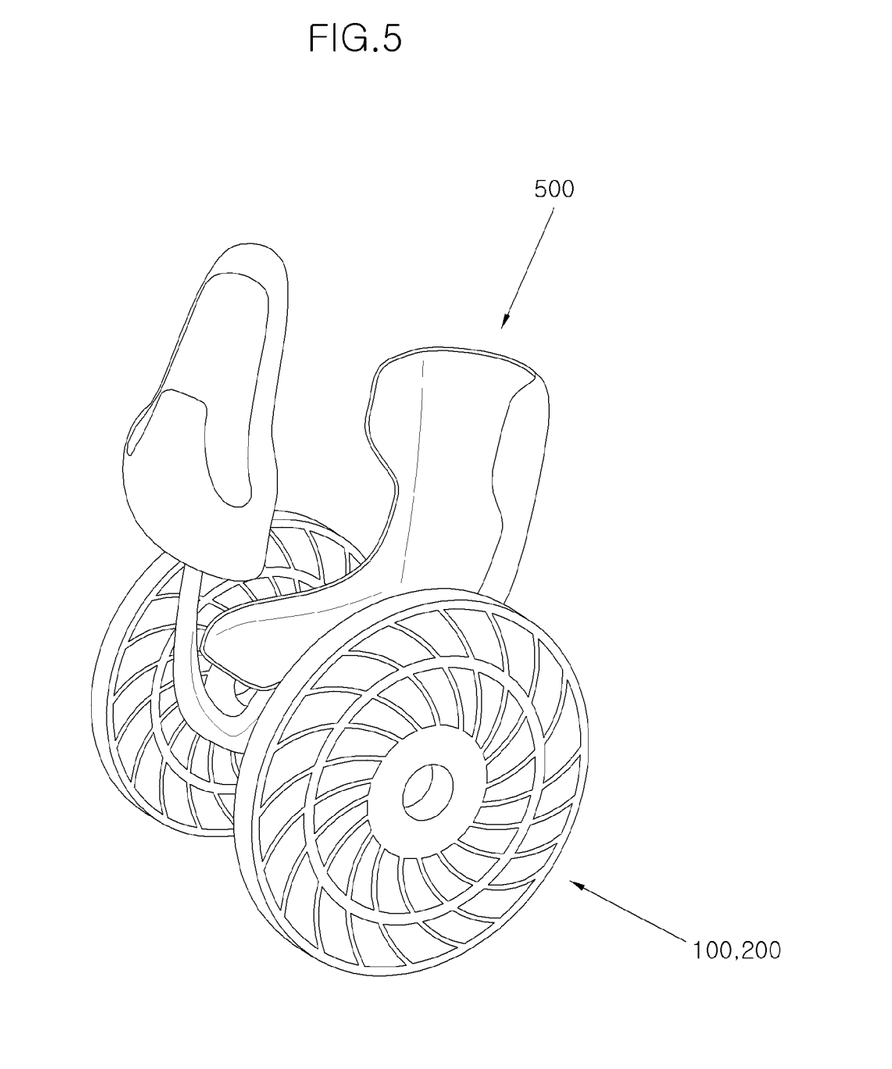

A means of transportation 400 and a wheelchair 500 having the flexible wheel 10 as described above are illustrated in FIGS. 4 and 5, respectively. As shown in FIGS. 4 to 5, when using the flexible wheel 10 according to one form of the present disclosure, a user can easily go up and down the stairs and obstacles anywhere in the city. Particularly, if the flexible wheel 10 of one form of the present disclosure is installed into a wheelchair 500, a combination of a cruise control device and a wired/wireless controller can be applied to the flexible wheel 10 to provide a wheelchair user with freedom of movement.

According to the flexible wheel of one form of the present disclosure configured as described above, even if the flexible wheel 10 is driven on a top surface of a continuous obstacle like stairs, the flexible tire section is deformed in shape in the radial direction from the circumference according to the shape of the top surface of the obstacle, whereas a deformation of the flexible tire section in a circumferential direction is inhibited by the anti-bending guide section. Accordingly, the rotational center of the flexible tire section is maintained and the occurrence of vertical shaking of the flexible tire section is inhibited.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirt and scope of the present disclosure.

What is claimed is:

1. A flexible wheel for connecting to a driving shaft on which a fixing nut is mounted, the flexible wheel comprising:
    a flexible tire section being deformable in a radial direction from a circumference thereof; and
    an anti-bending guide section coupled with the flexible tire section,
    wherein the anti-bending guide section is connected to the driving shaft, and the flexible tire section and the anti-bending guide section are concentric,
    wherein the anti-bending guide section comprises;
    a plurality of plates formed integrally with one or more inner layers of the flexible tire section;
    a hub provided with a plurality of through hinges passing through the plates and the one or more inner layers; and
    a plurality of guides, each of which being formed in a form of bar having a width, being hingedly fixed to an outer layer of the flexible tire section through one end thereof and having a slit formed therein, and
    wherein each of the through hinges is moved in the slit in a longitudinal direction of the respective guides.

2. The flexible wheel of claim 1, wherein the flexible tire section comprises;
    a ring-shaped outer layer;
    one or more inner layers having an inner diameter smaller than an inner diameter of the outer layer and being concentric with the outer layer; and
    a plurality of spokes formed to extend from an inner circumferential surface of the outer layer to an outer circumferential surface of a first inner layer or formed to extend from an inner circumferential surface of the first inner layer to the outer circumferential surface of a second inner layer.

3. The flexible wheel of claim 2, wherein the plurality of spokes are rounded in a rotational direction of the flexible tire section to have a streamline shape.

4. The flexible wheel of claim 3, wherein the spokes generate a supporting force and a climbing force when the flexible wheel goes up stairs.

5. The flexible wheel of claim 2, wherein each of the plurality of spokes extends from the second inner layer having the smallest inner diameter among the one or more inner layers and passes through the first inner layer towards the outer layer while having a variable curvature.

6. The flexible wheel of claim 1, wherein the hub comprises a hub body to which the plurality of through hinges are perpendicularly fixed.

7. The flexible wheel of claim 6, wherein a fastening hole through which the driving shaft passes is formed at a center of the hub body in a state where the driving shaft passes through the fastening hole, so that the flexible tire section and the anti-bending guide section are subordinated to the driving shaft.

8. The flexible wheel of claim 1, wherein the plurality of plates comprise:
    a first plate being in contact with the one or more inner layers; and
    a second plate overlapping the first plate to cover first guides arranged on one surface of the first plate.

9. The flexible wheel of claim 8, wherein second guides are arranged on one surface of the second plate, the plates further comprises a third plate overlapping the second plate to cover the second guides arranged on one surface of the second plate, and the first guides which are in contact with the first plate and the second guides which are in contact with the third plate form a predetermined angle so as not to overlap each other.

10. The flexible wheel of claim 8, wherein the anti-bending guide section further comprises a fixing plate which is symmetrical with the first plate with respect to the flexible tire section, and fixing members are mounted on the plurality of through hinges passing through the fixing plate to allow the flexible tire section and the anti-bending guide section to be assembled integrally with each other.

11. An equipment, capable of being moved without any restriction, to which the flexible wheel according to claim 1 is applied.

* * * * *